US008998227B1

(12) United States Patent
Chen (10) Patent No.: US 8,998,227 B1
(45) Date of Patent: Apr. 7, 2015

(54) PUSH BIKE CONVERTIBLE INTO ROCKING SEAT

(71) Applicant: Wang-Chuan Chen, Taichung (TW)

(72) Inventor: Wang-Chuan Chen, Taichung (TW)

( * ) Notice: Subject to any disclaimer, the term of this patent is extended or adjusted under 35 U.S.C. 154(b) by 0 days.

(21) Appl. No.: 14/180,397

(22) Filed: Feb. 14, 2014

(51) Int. Cl.
- *B62B 7/06* (2006.01)
- *B62B 3/02* (2006.01)
- *A47D 13/10* (2006.01)
- *B62K 9/00* (2006.01)

(52) U.S. Cl.
CPC . *B62B 3/02* (2013.01); *A47D 13/10* (2013.01); *B62K 9/00* (2013.01)

(58) Field of Classification Search
USPC ............................ 280/87.051, 38, 647, 87.05
See application file for complete search history.

(56) References Cited

U.S. PATENT DOCUMENTS

| | | | | |
|---|---|---|---|---|
| 3,827,719 A * | 8/1974 | Lohr et al. | ..................... | 280/259 |
| 5,273,300 A * | 12/1993 | Wells | ............................. | 280/259 |
| 6,641,456 B2 * | 11/2003 | Wang | ............................. | 446/440 |
| 6,860,497 B2 * | 3/2005 | Wang | ....................... | 280/87.021 |
| 7,070,188 B2 * | 7/2006 | Waldman et al. | ............... | 280/31 |
| 8,567,803 B2 * | 10/2013 | Bao | ................. | 280/218 |
| 2010/0253035 A1 * | 10/2010 | Miroewski | ................... | 280/200 |
| 2012/0043734 A1 * | 2/2012 | Loveland | ................ | 280/87.041 |

* cited by examiner

*Primary Examiner* — Jeffrey J Restifo
(74) *Attorney, Agent, or Firm* — Alan D. Kamrath; Kamrath IP Lawfirm, P.A.

(57) ABSTRACT

A push bike includes a frame, two wheel assemblies and two locking assemblies. The frame includes a curved bottom portion. The two wheel assemblies are pivotally connected with two opposite ends of the frame respectively. Each wheel assembly includes at least one wheel being contactable with the ground, and a limiting portion. Each locking assembly disposed in the frame and includes a limiting member abuttable against the limiting portion. Thus, the two wheel assemblies can be pivoted or locked with respect to the frame to cause the curved bottom portion to contact with the ground for rocking.

10 Claims, 8 Drawing Sheets

PUSH BIKE CONVERTIBLE INTO ROCKING SEAT

BACKGROUND OF THE INVENTION

1. Field of the Invention

The present invention relates to a push bike and, more particular, to a push bike to be convertible into a rocking seat such as a rocking horse.

2. Description of the Related Art

A push bike is a training bicycle built without any pedals, crankset and chain. The push bike helps children learn to balance, steer, walk, glide, and push themselves forward thereon without worrying about pedaling. To function properly, the push bike must be small enough that a child can walk the push bike while sitting comfortably in a saddle of the push bike, putting both feet flat on the ground. Thus, the child first walks the push bike while standing over the saddle, then while sitting in the saddle. Eventually, the child feels comfortable enough to run and scoot while riding the push bike, then to lift both feet off the ground and cruise while balancing on two wheels of the push bike.

Further, it is appreciated that the conventional push bike can helps children learn to balance, but, unfortunately, it only provides single entertainment option. Furthermore, the conventional push bike can not employ a rocking action for more entertainment options when the child is mounted upon or is riding the push bike.

Thus, a need exists for a novel push bike that mitigates and/or obviates the above disadvantages.

SUMMARY OF THE INVENTION

It is therefore an object of the present invention to provide an apparatus which, on the one hand, is a push bike for children to learn balance and walk, and which, on the other hand, is a rocking seat to provide entertainment options. Further preferably, the apparatus provides multi-functions to increase its economic value.

The problem described above is solved, according to the invention by a push bike having features of claim 1.

Accordingly a push bike is provided, which comprises:

a frame including a top portion and a curved bottom portion spaced form the top portion, and at least one first connecting portion formed between the top and bottom portions;

at least one wheel assembly including a second connecting portion pivotally connected with the first connecting portion of the frame, at least one wheel spaced from the second connecting portion and contactable with the ground, and a limiting portion disposed between the second connecting portion and the wheel; and at least one locking assembly mounted on the frame and adjacent to the first connecting portion, with the locking assembly including a limiting member movable with respect to the frame between locking and releasing positions, with the limiting member abuttable against the limiting portion of the wheel assembly and including a first end adjacent to the bottom portion of the frame, and a second end spaced from the first end and adjacent to the top portion of the frame.

The idea underlying the present invention is that, by pressing the limiting member to control the wheel assembly pivotable with respect to the frame.

When the limiting member is in the locking position, the limiting member is spaced from the frame, with one of the first and second ends of the limiting member abutting against the limiting portion of the wheel assembly to cause the wheel assembly unable to pivot with respect to the frame; and When the limiting member is in the releasing position, the limiting member is close to the frame, with one of the first and second ends of the limiting member disengaging from the limiting portion of the wheel assembly to cause the wheel assembly pivotable with respect to the frame between first and second positions.

Therefore, when the wheel assembly is in the first position, the first end of the limiting member abutting against the limiting portion of the wheel assembly, with the wheel of the wheel assembly contacted with the ground; and When the wheel assembly is in the second position, the second end of the limiting member abutting against the limiting portion of the wheel assembly, with the bottom portion of the frame contacted with the ground.

Advantageous developments and improvements of the push bike of the invention are contained in the dependent claims as well as in the detailed description, which refers to the figures of the drawings.

According to a further preferred development of the push bike of the invention, the frame includes at least one slot extending between the top and bottom portions and adjacent to the first connecting portion, with the limiting portion of the wheel assembly inserting through and slidable in the slot.

According to another preferred development of the push bike of the invention, the frame further includes at least one aperture disposed and interconnected between the first connecting portion and the slot, with the limiting member slidely arranged in the aperture and movable with respect to the frame.

In accordance with another preferred development, the locking assembly further includes a base member, and at least one biasing member, with the base member disposed in the first connecting portion, with two opposite ends of the biasing member respectively biasing against the limiting member and the base member.

According to a further enhancement of the push bike according to the invention, the first connecting portion is a through hole extending throughout two side walls of the frame and includes two first joining portions formed at an inner periphery thereof, with each of two terminal ends of the base member including two second joining portions, with each of the two first joining portions is arranged and fixed between the two second joining portions.

According to another improvement of the push bike according to the invention, the base member includes a ledge portion disposed in the aperture, and at least one receiving hole formed at the ledge portion to receive the biasing member.

According to an improvement, the limiting member further includes a pressing portion formed between the first and second ends and abutted against the biasing member, with the pressing portion abuttable against the limiting portion of the wheel assembly.

According to a further development, the push bike comprising two wheel assemblies, and two locking assemblies respectively mounted on two opposite ends of the frame, with the frame includes two first connecting portions respectively formed at the two opposite ends thereof, with the two second connecting portions of the two wheel assemblies respectively pivotally connected with the two first connecting portions of the frame, with each of the two wheel assemblies includes two wheels, with an arm portion connected between each of the two wheels and the second connecting portion of each of the two wheel assemblies, with the limiting portion connected between the two arm portions of each of the two wheel assemblies.

According to one particularly preferred development, each of the two wheel assemblies includes two components, and two mounted portions each formed at one end of each of the two components, with each of the two wheels connected with another end of each of the two components, with the two components connected with each other to form the second connecting portion.

According to a variant of the preceding development, the frame includes a handle disposed adjacent to the first connecting portion.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

An advantage of the present invention provides a push bike to provide multi-functions.

Other objects, advantages, and new features of the present invention will become apparent from the following detailed description of the invention when considered in conjunction with the accompanied drawings.

BRIEF DESCRIPTION OF THE DRAWINGS

The illustrative embodiment may best be described by reference to the accompanying drawings where.

All figures are drawn for ease of explanation of the basic teachings only; the extensions of the figures with respect to number, position, relationship, and dimensions of the parts to form the illustrative embodiments will be explained or will be within the skill of the art after the following teachings have been read and understood. Further, the exact dimensions and dimensional proportions to conform to specific force, weight, strength, and similar requirements will likewise be within the skill of the art after the following teachings have been read and understood.

Where used in the various figures of the drawings, the same numerals designate the same or similar parts. Furthermore, when the terms "first", "second", "third", "fourth", "end", "portion", "longitudinal", "radial", "diameter", "width", "thickness", and similar terms are used herein, it should be understood that these terms have reference only to the structure shown in the drawings as it would appear to a person viewing the drawings and are utilized only to facilitate describing the invention.

DETAILED DESCRIPTION OF THE INVENTION

FIGS. 1 through 8 show a push bike according to the present invention shown in the drawings. The push bike includes a frame 10, at least one wheel assembly 20, and at least one locking assembly 30. In the preferred form, the wheel assembly 20 and the locking assembly 30 have the same number. In the embodiment, the push bike includes two wheel assemblies 20 and two locking assemblies 30 respectively disposed at two opposite ends of the frame 10.

Figure 1:
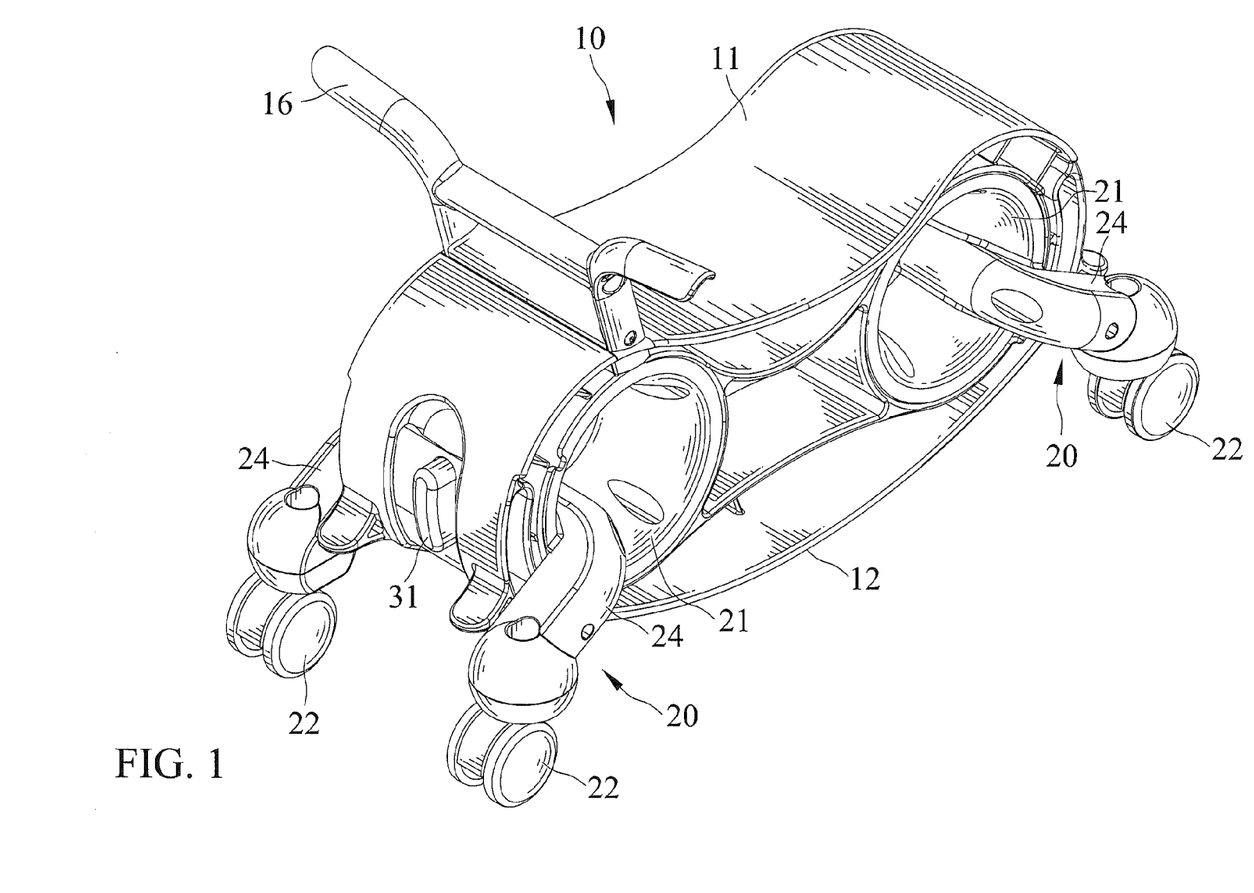
FIG. 1 shows a perspective view of a push bike according to the present invention and illustrates two wheel assemblies in a first position.
Figure 2:
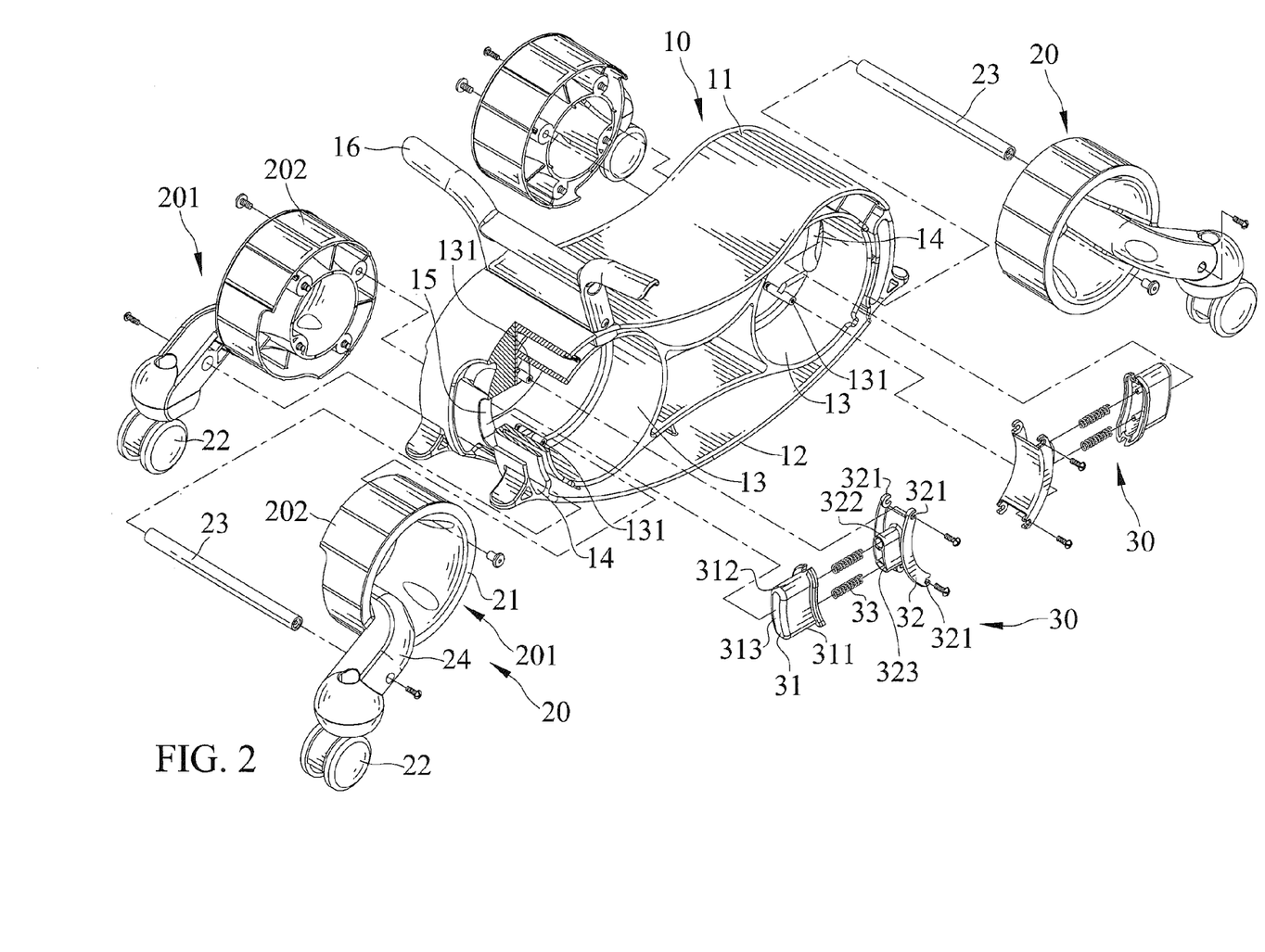
FIG. 2 shows an exploded perspective view of the push bike of FIG. 1.
Figure 3:
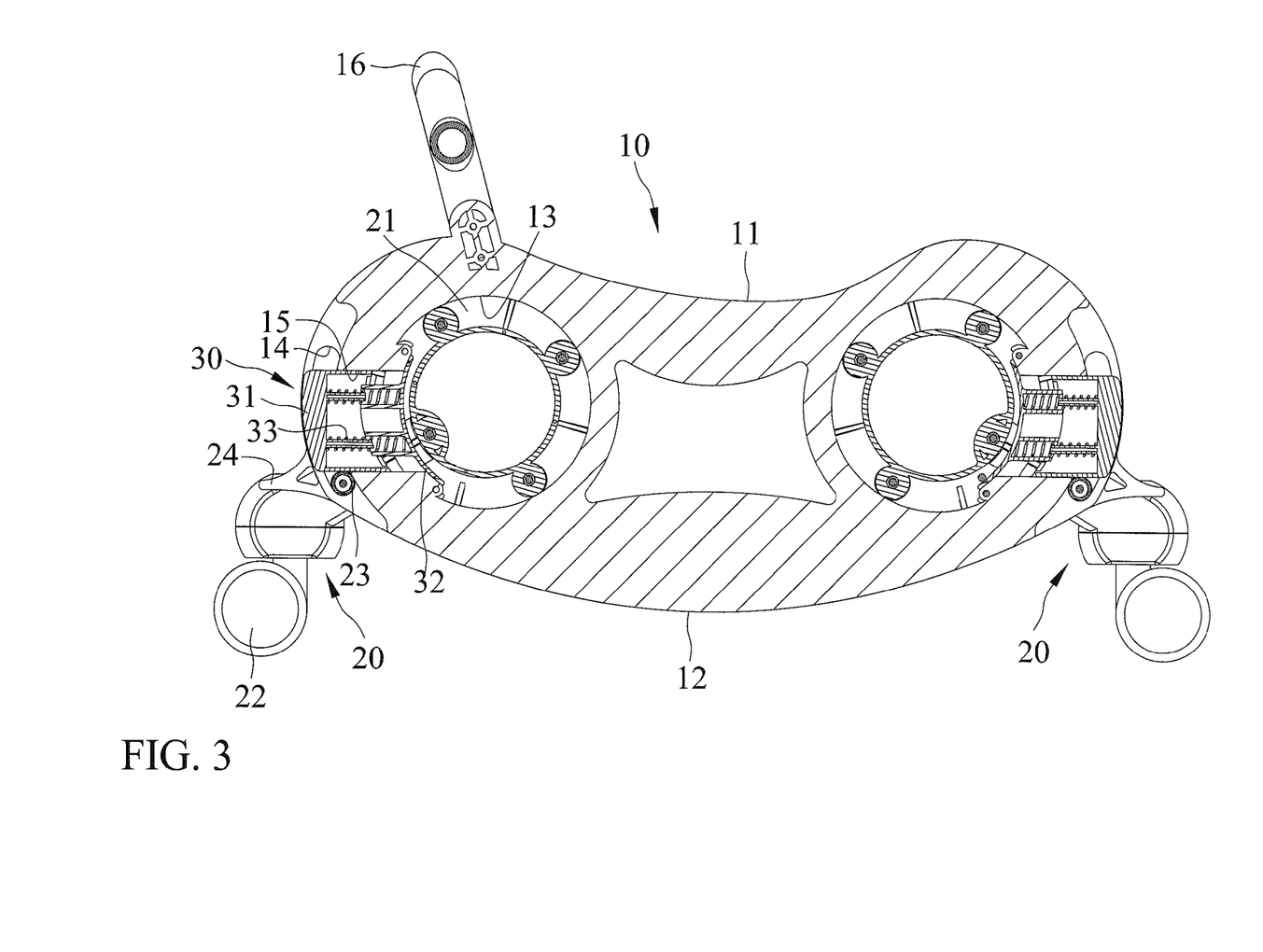
FIG. 3 shows a cross-sectional view of the push bike shown in FIG. 1.

The frame 10 includes a curved top portion 11, a curved bottom portion 12, at least one first connecting portion 13, at least one slot 14, and at least one aperture 15. In the embodiment, the frame 10 includes two first connecting portions 13, two slots 14, and two apertures 15. The top portion 11 is adapted for a child sitting thereon. The curved bottom portion 12 is spaced form the top portion 11 in a height direction and contactable with a floor such as the ground. The two first connecting portions 13 are respectively disposed at the two opposite ends of the frame 10 in a length direction being perpendicular to the height direction. Each of the two first connecting portions 13 is disposed between the top and bottom portions 11 and 12. In a preferred form, each of the two first connecting portions 13 is a through hole extending throughout two side walls of the frame 10 in a width direction being perpendicular to the length direction. Moreover, each of the two first connecting portions 13 has a circular cross section and includes two first joining portions 131 formed at an inner periphery thereof. Each of the two slots 14 is extended throughout the two side walls of the frame 10 between the top and bottom portions 11 and 12 in the width direction and adjacent to each of the two first connecting portions 13. Each of the two apertures 15 is disposed and interconnected between each first connecting portion 13 and each slot 14. Additionally, the frame 10 further includes a handle 16 disposed adjacent to one of the two first connecting portions 13.

Each of the two wheel assemblies 20 is pivotally connected with the two opposite ends of the frame 10 and pivotable with respect to the frame 10 between first and second positions. Each of the two wheel assemblies 20 includes a second connecting portion 21, at least one wheel 22, and a limiting portion 23. In the embodiment, each of the two wheel assemblies 20 includes two wheels 22. The second connecting portion 21 and the two wheels 22 are respectively disposed at two opposite ends of each wheel assembly 20. The second connecting portion 21 of each wheel assembly 20 is pivotally connected with each first connecting portion 13 of the frame 10. The two wheels 22 are spaced from the second connecting portion 21 of each wheel assembly 20 and contactable with the floor such as the ground. The limiting portion 23 of each wheel assembly 20 is disposed between the second connecting portion 21 and the two wheels 22 and inserts through and slidable in each of the two slots 14 of the frame 10 in the width direction. In a preferred form, an arm portion 24 is connected between each of the two wheels 22 and the second connecting portion 21 of each wheel assembly 20. Each limiting portion 23 is connected between the two arm portions 24 of each wheel assembly 20 by fasteners such as screws, and which may, if desired, each limiting portion 23 and the two arm portions 24 of each wheel assembly 20 can be formed as one piece. Furthermore, in the embodiment, each of the two wheel assemblies 20 includes two components 201, and two mounted portions 202 each formed at one end of each component 201. Each of the two wheels 22 is connected with another end of each component 201. The two components 201 of each wheel assembly 20 are connected with each other to form the second connecting portion 21.

Figure 4:
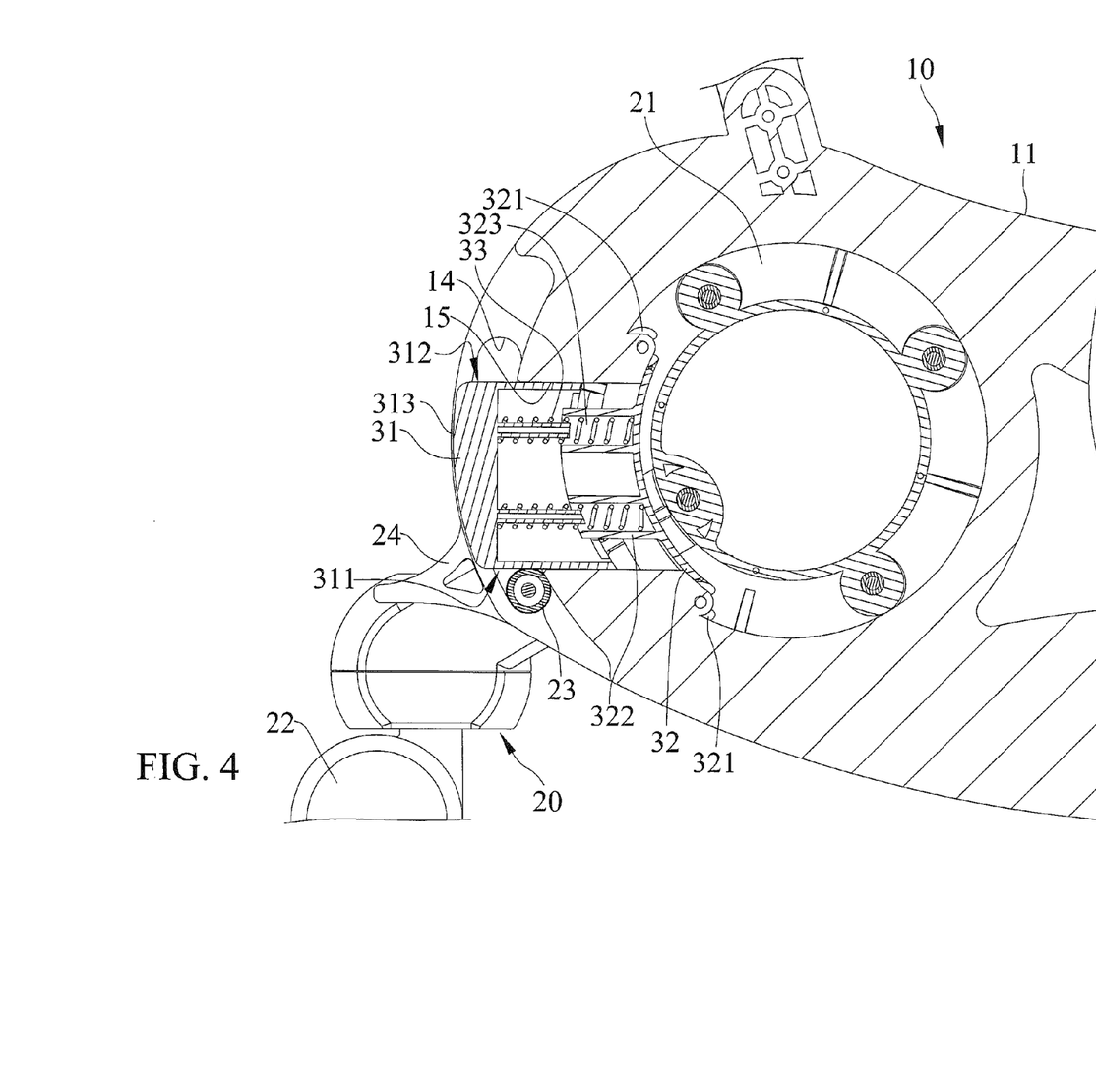
FIG. 4 shows a partial, enlarged view of the push bike shown in FIG. 3 and illustrates a locking assembly in a locking position.

Each of the two locking assemblies 30 is mounted on the frame 10 and adjacent to each first connecting portion 13. Each of the two locking assemblies 30 includes a limiting member 31, a base member 32, and at least one biasing member 33. In this embodiment, each of the two locking assemblies 30 includes two biasing member 33 which can be springs. The limiting member 31 of each locking assembly 30 is slidely arranged in each aperture 15 to be movable with respect to the frame 10 between locking and releasing positions. Thus, the limiting member 31 of each locking assembly 30 is abuttable against the limiting portion 23 of each wheel assembly 20. In the preferred form, the limiting member 31 of each locking assembly 30 includes a first end 311 adjacent to the bottom portion 12 of the frame 10, a second end 312 spaced from the first end 311 and adjacent to the top portion 11 of the frame 10, and a pressing portion 313 formed between the first and second ends 311 and 312 to be abutted against the two biasing members 33. The pressing portion 313 of each locking assembly 30 is abuttable against the limiting portion 23 of the wheel assembly 20. The base member 32 of each locking assembly 30 is disposed in each first connecting portion 13 of the frame 10. Further, each of two terminal ends of the base member 32 includes two second joining portions 321, and each of the two first joining portions 131 of each first connecting portion 13 is arranged and fixed between the two second joining portions 321 of the base member 32 of each locking assembly 30. The base member 32 of each locking assembly 30 further includes a ledge portion 322 disposed in each aperture 15 of the frame 10, and two cavities 323 formed at the ledge portion 322 to receive the two biasing members 33. Two opposite ends of each biasing member 33 respectively bias against the limiting member 31 and the base member 32 of each locking assembly 30.

When the limiting member 31 is in the locking position, the limiting member 31 is spaced from the frame 10, and one of the first and second ends 311 and 312 of the limiting member 31 abuts against the limiting portion 23 of the wheel assembly 20 to cause the wheel assembly 20 unable to pivot with respect to the frame 10.

Figure 5:
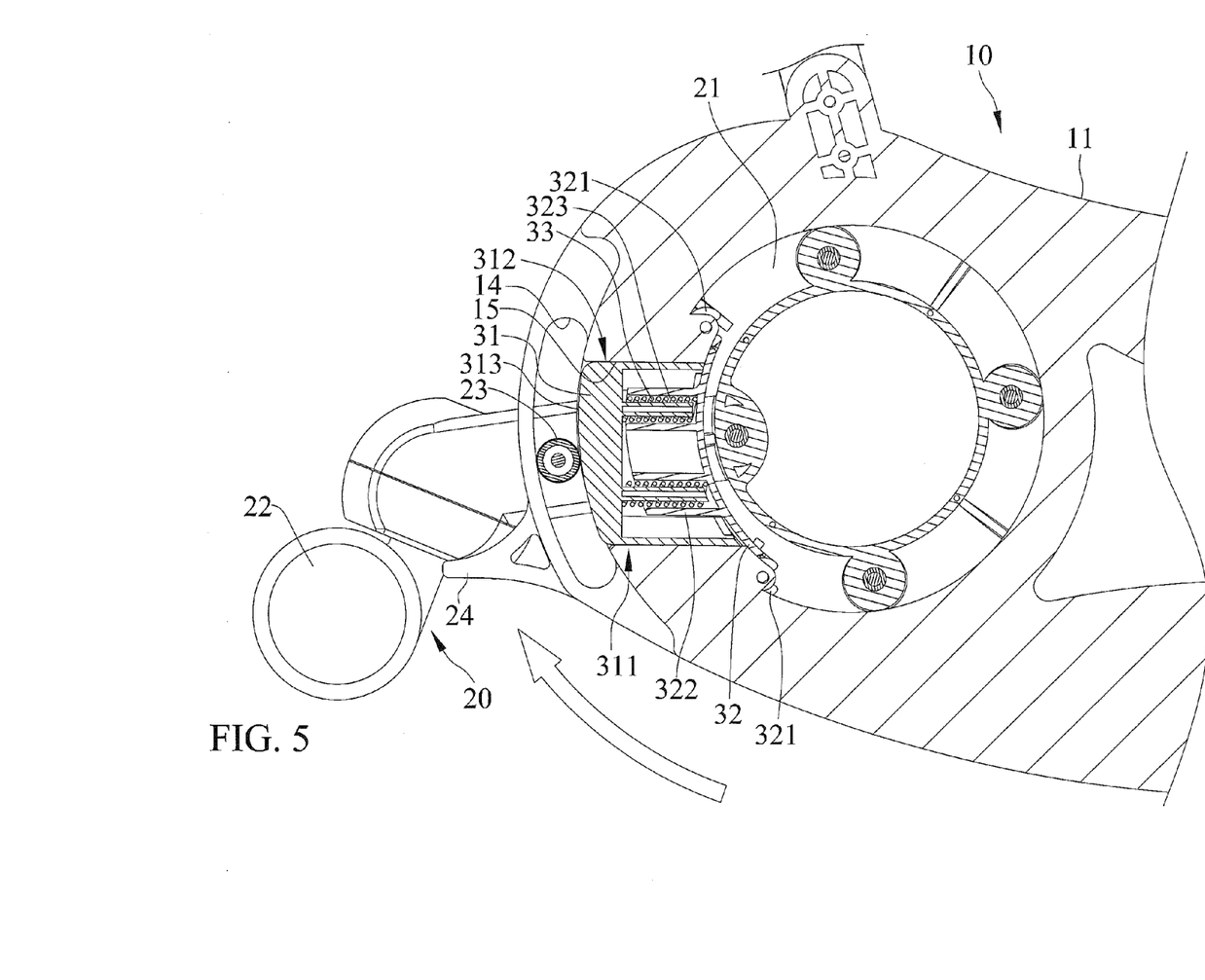
FIG. 5 shows a continued view of the push bike shown in FIG. 4 and illustrates the locking assembly in a releasing position, and the wheel assembly pivoting with respect to a frame.

Pressing the pressing portion 313 causes the limiting member 31 converted from the locking position to the releasing position.

When the limiting member 31 is in the releasing position, the limiting member 31 is close to the frame 10 and compresses the two biasing members 32, and one of the first and second ends 311 and 312 of the limiting member 31 disengaging from the limiting portion 23 of the wheel assembly 20 to cause the wheel assembly 20 pivotable with respect to the frame 10 between first and second positions.

Additionally, the pressing portion 313 stops being pressed, the two biasing members 32 will elastically recover to cause the limiting member 31 from the releasing position to the locking position.

When the wheel assembly 20 is in the first position, the first end 311 of the limiting member 31 abuts against the limiting portion 23 of the wheel assembly 20, and the two wheels 22 of the wheel assembly 20 contacted with the ground. Thus, the child can sit on the top portion 11 and walk the push bike.

Figure 6:
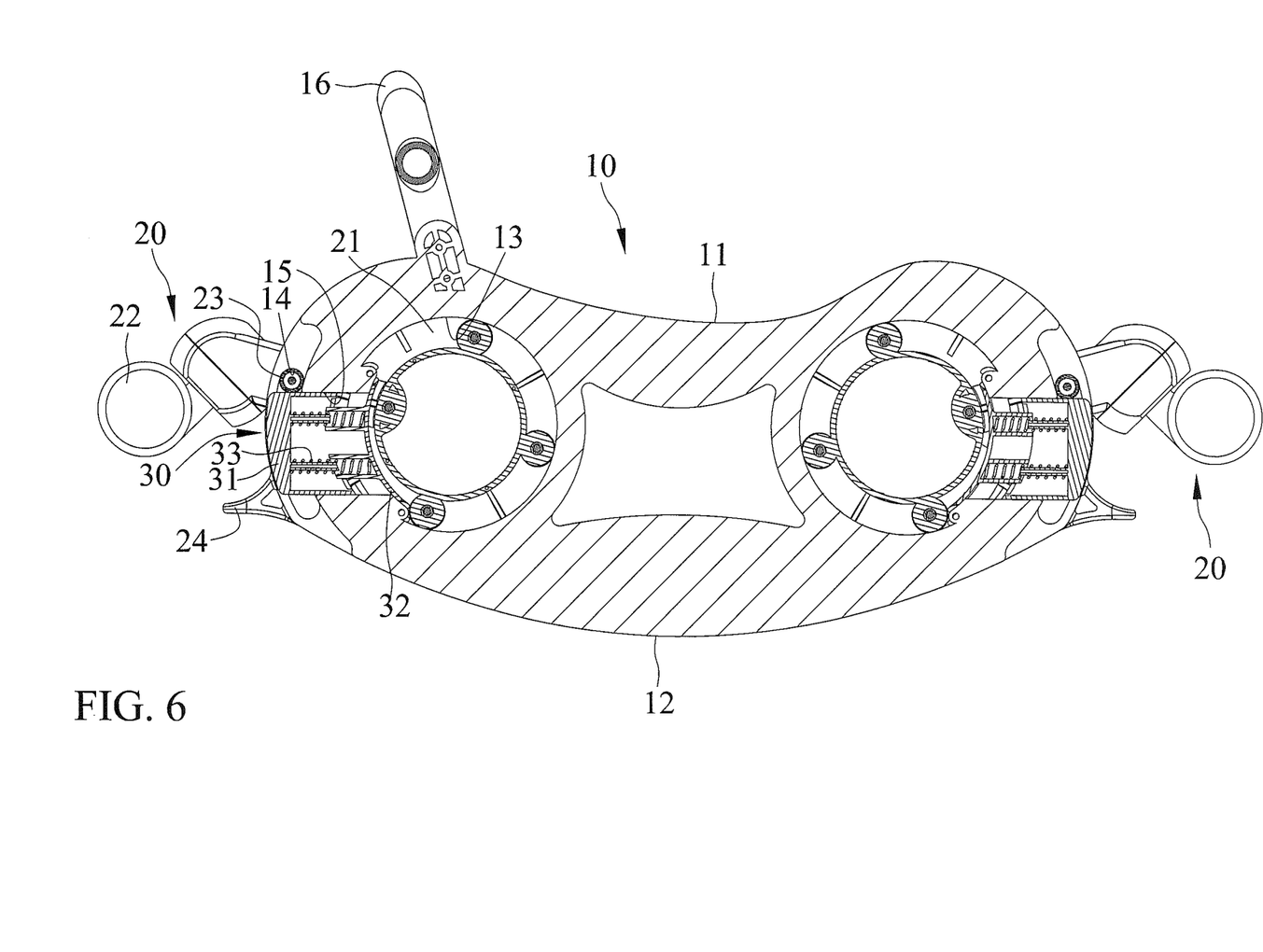
FIG. 6 shows a continued view of the push bike shown in FIG. 3 and illustrates the two wheel assemblies in a second position.
Figure 7:
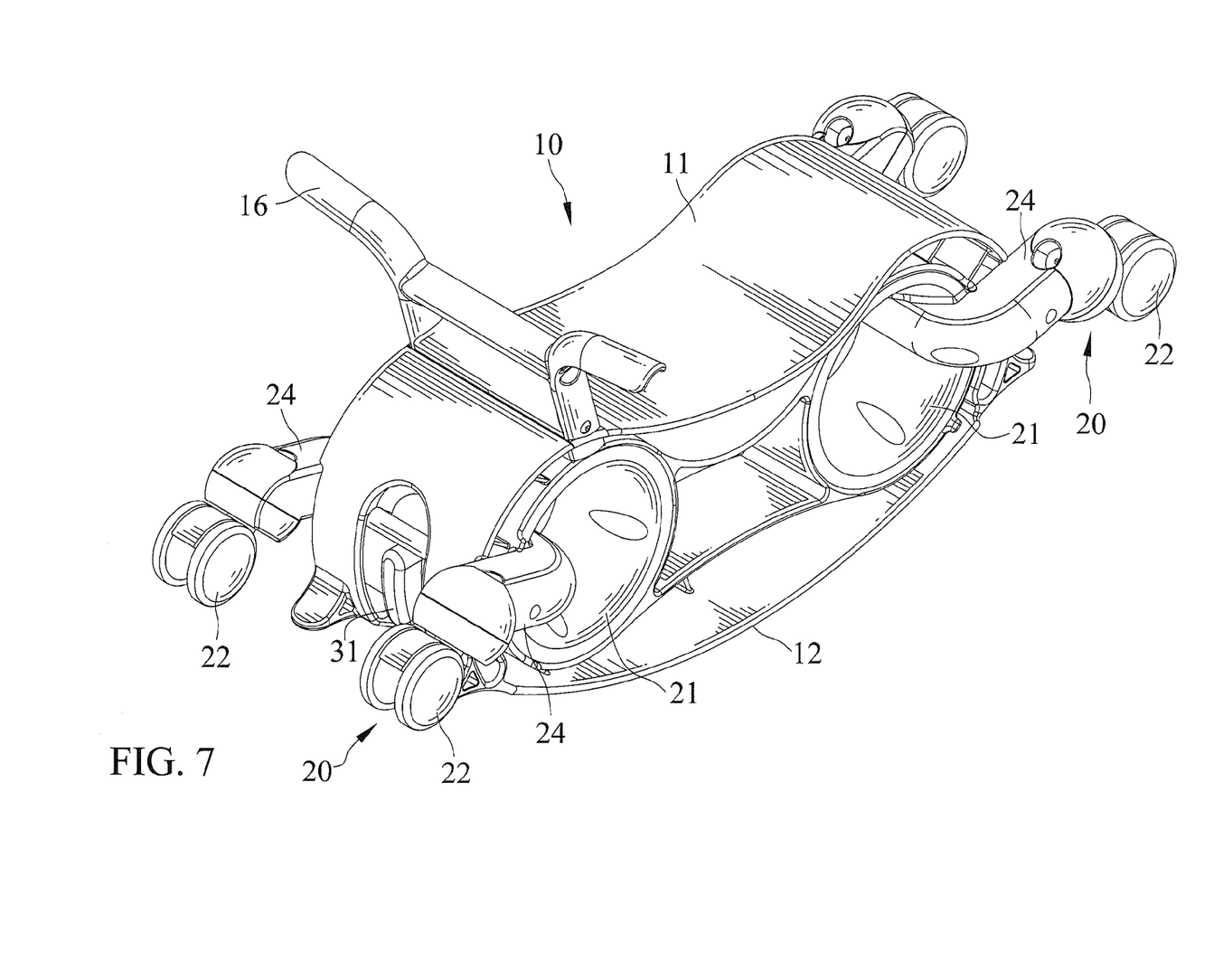
FIG. 7 shows another perspective view of the push bike according to the present invention and illustrates two wheel assemblies in the second position.
Figure 8:
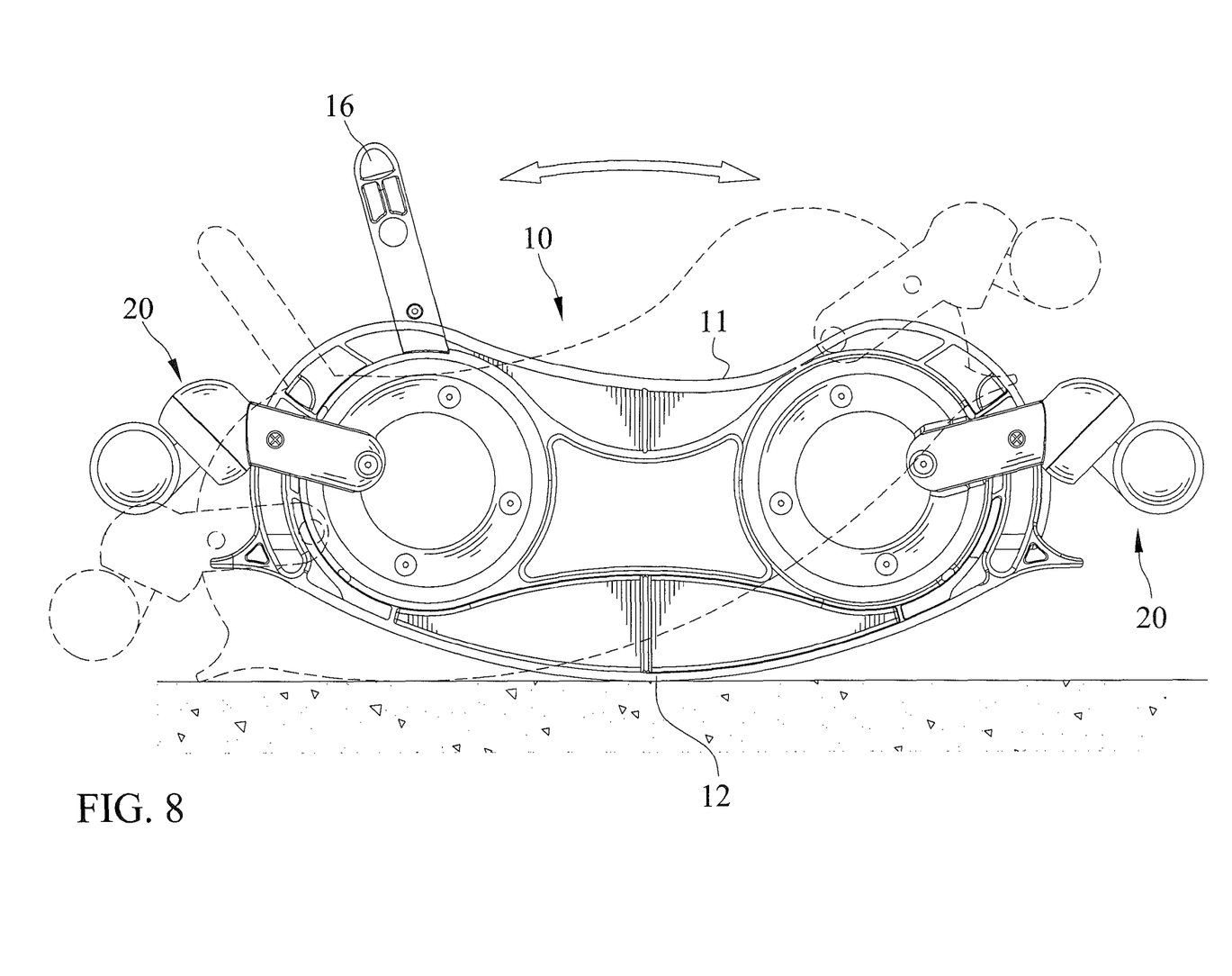
FIG. 8 shows a side view of the push bike shown in FIG. 7 and illustrates the push bike rocking back and forth.

When the wheel assembly 20 is in the second position, the second end 312 of the limiting member 31 abuts against the limiting portion 23 of the wheel assembly 20, and the bottom portion 12 of the frame 10 contacted with the ground. Thus, the child can sit on the top portion 11 and rock back and forth by shifting his/her weight or pushing lightly with his/her feet.

Now that the basic teachings of the push bike have been explained, many extensions and variations will be obvious to one having ordinary skill in the art. For example, the frame 10, the wheel assembly 20, and the locking assembly 30 can have shapes different from those shown in the figures.

Thus since the illustrative embodiment disclosed herein may be embodied in other specific forms without departing from the spirit or general characteristics thereof, some of which forms have been indicated, the embodiment described herein is to be considered in all respects illustrative and not restrictive. The scope is to be indicated by the appended claims, rather than by the foregoing description, and all changes which come within the meaning and range of equivalency of the claims are intended to be embraced therein.

What is claimed is:

1. A push bike comprising:

a frame including a top portion and a curved bottom portion spaced form the top portion, and at least one first connecting portion formed between the top and bottom portions;

at least one wheel assembly including a second connecting portion pivotally connected with the first connecting portion of the frame, at least one wheel spaced from the second connecting portion and contactable with the ground, and a limiting portion disposed between the second connecting portion and the wheel; and at least one locking assembly mounted on the frame and adjacent to the first connecting portion, with the locking assembly including a limiting member movable with respect to the frame between locking and releasing positions, with the limiting member abuttable against the limiting portion of the wheel assembly and including a first end adjacent to the bottom portion of the frame, and a second end spaced from the first end and adjacent to the top portion of the frame;

wherein when the limiting member is in the locking position, the limiting member is spaced from the frame, with one of the first and second ends of the limiting member abutting against the limiting portion of the wheel assembly to cause the wheel assembly unable to pivot with respect to the frame;

wherein when the limiting member is in the releasing position, the limiting member is close to the frame, with one of the first and second ends of the limiting member disengaging from the limiting portion of the wheel assembly to cause the wheel assembly pivotable with respect to the frame between first and second positions;

wherein when the wheel assembly is in the first position, the first end of the limiting member abutting against the limiting portion of the wheel assembly, with the wheel of the wheel assembly contacted with the ground;

wherein when the wheel assembly is in the second position, the second end of the limiting member abutting against the limiting portion of the wheel assembly, with the bottom portion of the frame contacted with the ground.

2. The push bike as claimed in claim 1, wherein the frame includes at least one slot extending between the top and bottom portions and adjacent to the first connecting portion, with the limiting portion of the wheel assembly inserting through and slidable in the slot.

3. The push bike as claimed in claim 2, wherein the frame includes at least one aperture disposed and interconnected between the first connecting portion and the slot, with the limiting member slidely arranged in the aperture and movable with respect to the frame.

4. The push bike as claimed in claim 3, wherein the locking assembly further includes a base member, and at least one biasing member, with the base member disposed in the first connecting portion, with two opposite ends of the biasing member respectively biasing against the limiting member and the base member.

5. The push bike as claimed in claim 4, wherein the first connecting portion is a through hole extending throughout two side walls of the frame and includes two first joining portions formed at an inner periphery thereof, with each of two terminal ends of the base member including two second joining portions, with each of the two first joining portions is arranged and fixed between the two second joining portions.

6. The push bike as claimed in claim 4, wherein the base member includes a ledge portion disposed in the aperture, and at least one cavity formed at the ledge portion to receive the biasing member.

7. The push bike as claimed in claim 4, wherein the limiting member further includes a pressing portion formed between the first and second ends and abutted against the biasing member, with the pressing portion abuttable against the limiting portion of the wheel assembly.

8. The push bike as claimed in claim 1 comprising two wheel assemblies, and two locking assemblies respectively mounted on two opposite ends of the frame, with the frame including two first connecting portions respectively formed at the two opposite ends thereof, with the two second connecting portions of the two wheel assemblies respectively pivotally connected with the two first connecting portions of the frame, with each of the two wheel assemblies including two wheels, with an arm portion connected between each of the two wheels and the second connecting portion of each of the two wheel assemblies, with the limiting portion connected between the two arm portions of each of the two wheel assemblies.

9. The push bike as claimed in claim 8, wherein each of the two wheel assemblies includes two components, and two mounted portions each formed at one end of each of the two components, with each of the two wheels connected with another end of each of the two components, with the two components connected with each other to form the second connecting portion.

10. The push bike as claimed in claim 1, wherein the frame includes a handle disposed adjacent to the first connecting portion.

* * * * *